(12) United States Patent
Yamamoto (10) Patent No.: US 6,870,646 B1
(45) Date of Patent: Mar. 22, 2005

(54) IMAGE READING SYSTEM (75) Inventor: Yasuhiro Yamamoto, Tokyo (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 09/208,859

(22) Filed: Dec. 10, 1998

(30) Foreign Application Priority Data

Dec. 11, 1997 (JP) .......................................... P09-362215

(51) Int. Cl.⁷ ............................................... H04N 1/32
(52) U.S. Cl. ....................... 358/442; 358/443; 358/444; 358/474
(58) Field of Search .......................... 347/102; 359/618; 379/504; 600/485; 358/401, 408, 442, 404, 443, 444, 468, 474, 1.9, 1.15

(56) References Cited

U.S. PATENT DOCUMENTS

| | | | | |
|---|---|---|---|---|
| 4,215,243 A | * | 7/1980 | Maxwell ................... 379/93.34 |
| 5,465,133 A | * | 11/1995 | Aoki et al. .................. 348/363 |
| 5,548,782 A | * | 8/1996 | Michael et al. ............... 710/15 |
| 5,606,420 A | * | 2/1997 | Maeda et al. ............... 358/296 |
| 5,631,700 A | * | 5/1997 | Sato ........................ 348/222.1 |
| 5,673,190 A | * | 9/1997 | Kahleck et al. ................ 700/2 |
| 5,727,049 A | * | 3/1998 | Sato ........................... 379/504 |
| 5,832,244 A | * | 11/1998 | Jolley et al. ................ 710/305 |
| 5,978,609 A | * | 11/1999 | Aoki ......................... 396/429 |
| 6,038,034 A | * | 3/2000 | Nishio et al. ............... 358/404 |
| 6,045,510 A | * | 4/2000 | Ogura et al. ................ 600/485 |
| 6,067,169 A | * | 5/2000 | Ohnishi ...................... 358/1.9 |
| 6,115,137 A | * | 9/2000 | Ozawa et al. ................ 358/1.6 |
| 6,116,728 A | * | 9/2000 | Miyake et al. .............. 347/102 |
| 6,122,105 A | * | 9/2000 | Kawai et al. ................ 359/618 |

* cited by examiner

Primary Examiner—Edward Coles
Assistant Examiner—Joseph R. Pokrzywa
(74) Attorney, Agent, or Firm—Greenblum & Bernstein, P.L.C.

(57) ABSTRACT

The image reading system comprises an image reading device, to which an external interface adaptor and a recording medium interface adaptor can be selectively connected. The external interface adaptor is provided with an interface circuit by which a format of image data is converted to that which conforms to a device provided externally to the image reading device. The device may be a computer. The recording medium interface adaptor is provided with a recording medium attaching unit to which a recording medium is attachable. An operation switch is disposed on the recording medium interface adaptor so that the image data can be recorded to the recording medium.

8 Claims, 7 Drawing Sheets

IMAGE READING SYSTEM

BACKGROUND OF THE INVENTION

1. Field of the Invention

The present invention relates to an image reading device in which an image, recorded in a film, for example, is read by a line sensor, and more particularly to a construction for connecting the image reading device to a peripheral device provided externally to the image reading device.

2. Description of the Related Art

Conventionally, an image reading device can be connected to a computer, for example, and thus image data obtained by the image reading device is transferred to the computer, so that an image is indicated on a monitor device of the computer, or the image data is recorded to a recording medium attached to the computer. Image data outputted from the image reading device and image data handled by the computer should conform to predetermined standards, respectively. Namely, the computer should have an interface circuit, by which input image data is converted so as to conform to the interface standard of the computer. Thus, the specifications of the interface of the image reading device and that of the computer should coincide with each other.

Accordingly, a construction of a hardware device, such as a computer which is provided externally to the image reading device and can be connected thereto, is restricted, and thus the connection of an arbitrary device to the image reading device is difficult.

SUMMARY OF THE INVENTION

Therefore, an object of the present invention is to improve a degree of freedom of a type of peripheral device which can be connected to an image reading device.

According to the present invention, there is provided an image reading system comprising an image reading device and an interface adaptor. The image reading device reads an image recorded in a read object. The interface adaptor is detachably attached to the image reading device, so that image data is transferrable between the image reading device and a connectable device.

Further, according to the present invention, the image reading device reads an image recorded in a read object to generate image data corresponding to the image, and the interface adaptor is detachably attached to the image reading device, and converts a format of the image data to a format of a connectable device provided externally to the image reading device.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will be described below with reference to embodiments shown in the drawings.

Figure 1:
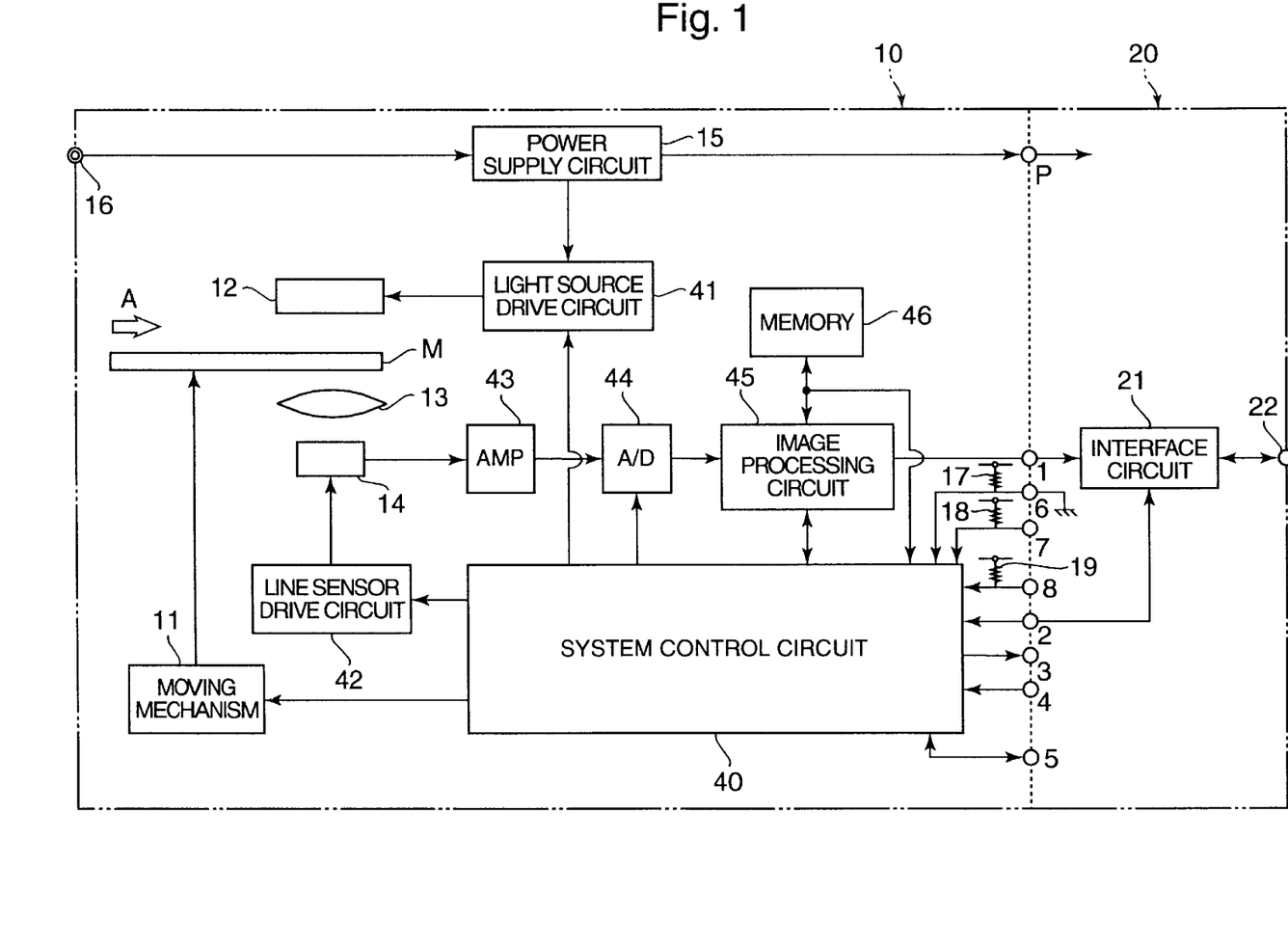
FIG. 1 is a block diagram showing an image reading device of an embodiment of the present invention, in a state in which an external interface adaptor is connected to the image reading device.

FIG. 1 shows an electrical construction of an image reading system of an embodiment of the present invention. In the image reading system, an external interface adaptor 20 or a recording medium interface adaptor can be connected to an image reading device 10. In a state shown in FIG. 1, the external interface adaptor 20 is connected to the image reading device 10.

The external interface adaptor 20 is attachable to and detachable from the image reading device 10, and a computer (not shown) is connected to the external interface adaptor 20. Namely, an image recorded in a read object M is read by the image reading device 10, and is then transferred to the computer through the external interface adaptor 20.

The read object M handled by this image reading device 10 is a transparent negative film on which an image has been recorded. The film M is intermittently moved, by a moving mechanism 11, in a direction shown by an arrow A. A light source 12 is disposed above a path along which the film M is moved. A forming lens 13 and a line sensor 14 are disposed under the path. The light source 12 is connected to a light source drive circuit 41, so that the light source 12 can be turned ON and OFF. The line sensor 14 is connected to a line sensor drive circuit 42, so that the image can be read by the line sensor 14. The moving mechanism 11, the light source drive circuit 41 and the line sensor drive circuit 42 are controlled in accordance with a command signal outputted by a system control circuit 40.

The image data read from the line sensor 14 are amplified by an amplifier 43 and are converted to a digital signal by an A/D converter 44. The digital image data are subjected to an image process, such as a shading correction, in an image processing circuit 45, and are then stored in a memory 46. The digital image data, subsequent to being read from the memory 46, are subjected to various correction processes, such as a color correction and a gamma correction.

The corrected digital image data are inputted to an external interface adaptor 20. The corrected digital image data are converted to a signal conforming to a predetermined format, which can be read by a computer (not shown) connected to the interface adaptor 20, by an interface circuit 21 provided therein. The formatted signal is then outputted through an interface connector 22 to the computer.

The A/D convertor 44, the image processing circuit 45 and the interface circuit 21 are controlled by the system control circuit 40.

The image reading device 10 is provided with an electric power supply circuit 15, which is connected to an electric power supply source (not shown) provided externally to the image reading device 10, through an electric terminal 16. Electric power outputted from the electric power supply circuit 15 is supplied to each of the circuits provided in the image reading device 10, and to the interface circuit 21 provided in the external interface adaptor 20 through a power supply connection terminal P. Note that the electric power supply circuit 15 may be disposed in the external interface adaptor 20.

The image reading device 10 is provided with eight terminals 1 through 8, besides the power supply connection terminal P. The first terminal 1 is provided for transmitting image data outputted from the image processing circuit 45 to the interface circuit 21 or a recording medium attaching unit 61 (see FIG. 4), which will be described later. The first terminal 1 has eight contact points when transmitted image data is 8 bits. The second terminal 2 is provided for connecting the system control circuit 40 to the interface circuit 21 or the recording medium attaching unit 61 (see FIG. 4). The third through fifth terminals 3, 4 and 5 are provided for connecting the system control circuit 40 to a recording medium interface adaptor, which will be described later. The sixth through eighth terminals 6, 7 and 8 are provided for recognizing the type of interface adaptor connected to the image reading device 10.

Pull-up resistors 17, 18 and 19 are connected to signal lines, each of which connects each of the sixth through eighth terminals 6, 7 and 8 to the system control circuit 40. When the external interface adaptor 20 is connected to the image reading device 10, the sixth terminal 6 is grounded, and the seventh and eighth terminals 7 and 8 are open. Therefore, when the external interface adaptor 20 is connected to the image reading device 10, a low level voltage signal is inputted to the system control circuit 40 through the sixth terminal 6, and high level voltage signals are inputted to the system control circuit 40 through the seventh and eighth terminals 7 and 8. Due to this, in the system control circuit 40, an external interface adaptor 20 having a specification (SCSI, for example) that has criteria conforming to that set by one of the standard-setting organizations, e.g. ISO, ANSI, is recognized as being connected to the image reading device 10.

A command signal, by which the external interface adaptor 20 is controlled, is generated in the system control circuit 40 based on the voltage signals generated by the sixth through eighth terminals 6, 7 and 8. The command signal is thus outputted to the external interface adaptor 20 through the second terminal 2.

Figure 2:
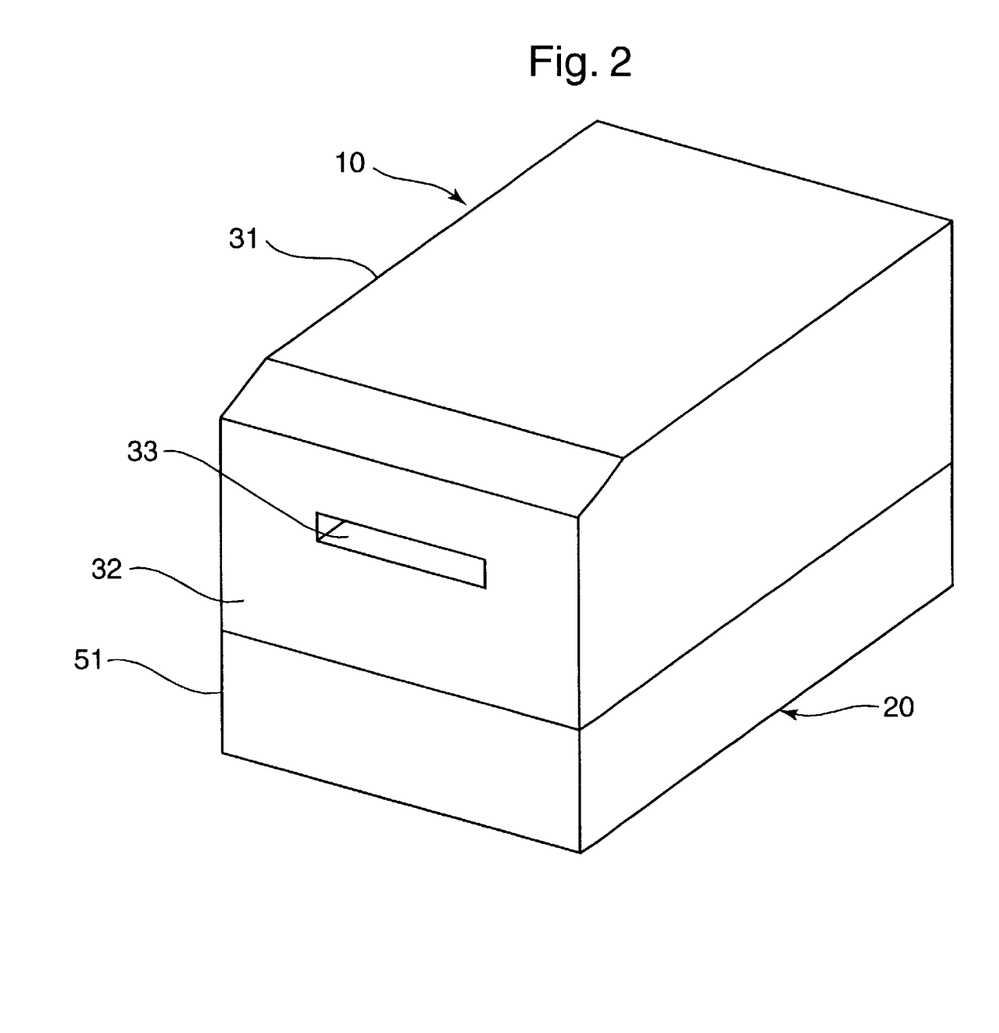
FIG. 2 is a perspective front-side view showing the image reading device to which the external interface adaptor is connected.

FIG. 2 shows the image reading device 10 to which the external interface adaptor 20 is connected, when viewing obliquely from the front side of the image reading device 10. A housing 31 of the image reading device 10 and a housing 51 of the external interface adaptor 20 are both box-shaped, with the latter being flatter than the former. A slot 33 is formed in a front surface 32 of the housing of the image reading device 10, enabling the read object M (see FIG. 1) to be inserted therein.

Figure 3:
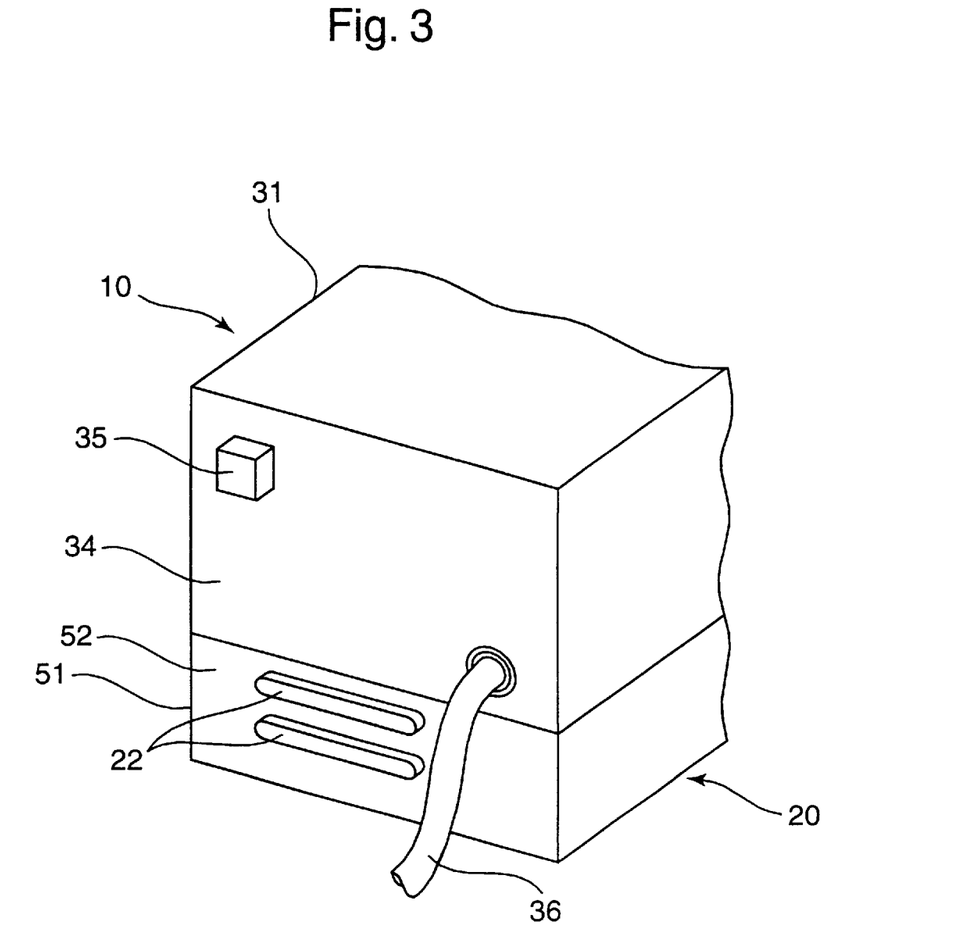
FIG. 3 is a perspective rear-side view showing the image reading device to which the external interface adaptor is connected.

FIG. 3 shows the image reading device 10 to which the external interface adaptor 20 is connected, when viewing obliquely from the rear side of the image reading device 10. An electrical power supply switch 35 and an electric power supply cable 36 are provided on a rear surface 34 of the housing 31 of the image reading device 10. The electrical power supply switch 35 is provided for performing an ON-OFF control of a power supply to the electric power supply circuit 15 (see FIG. 1). The electric power supply circuit 15 can be disposed in the interface adaptor 20, and in this case, the switch 35 and the cable 36 may be provided on the interface adaptor 20 instead. The electric power supply cable 36 is connected to the electric terminal 16 (see FIG. 1). Interface connectors 22 are provided on a rear surface 52 of the housing 51 of the external interface adaptor 20. The interface connectors 22 are constructed to conform to a standard using, for example, SCSI, RS232C, IEEE1394, USB, EPP (enhanced printer port) and the like.

Figure 4:
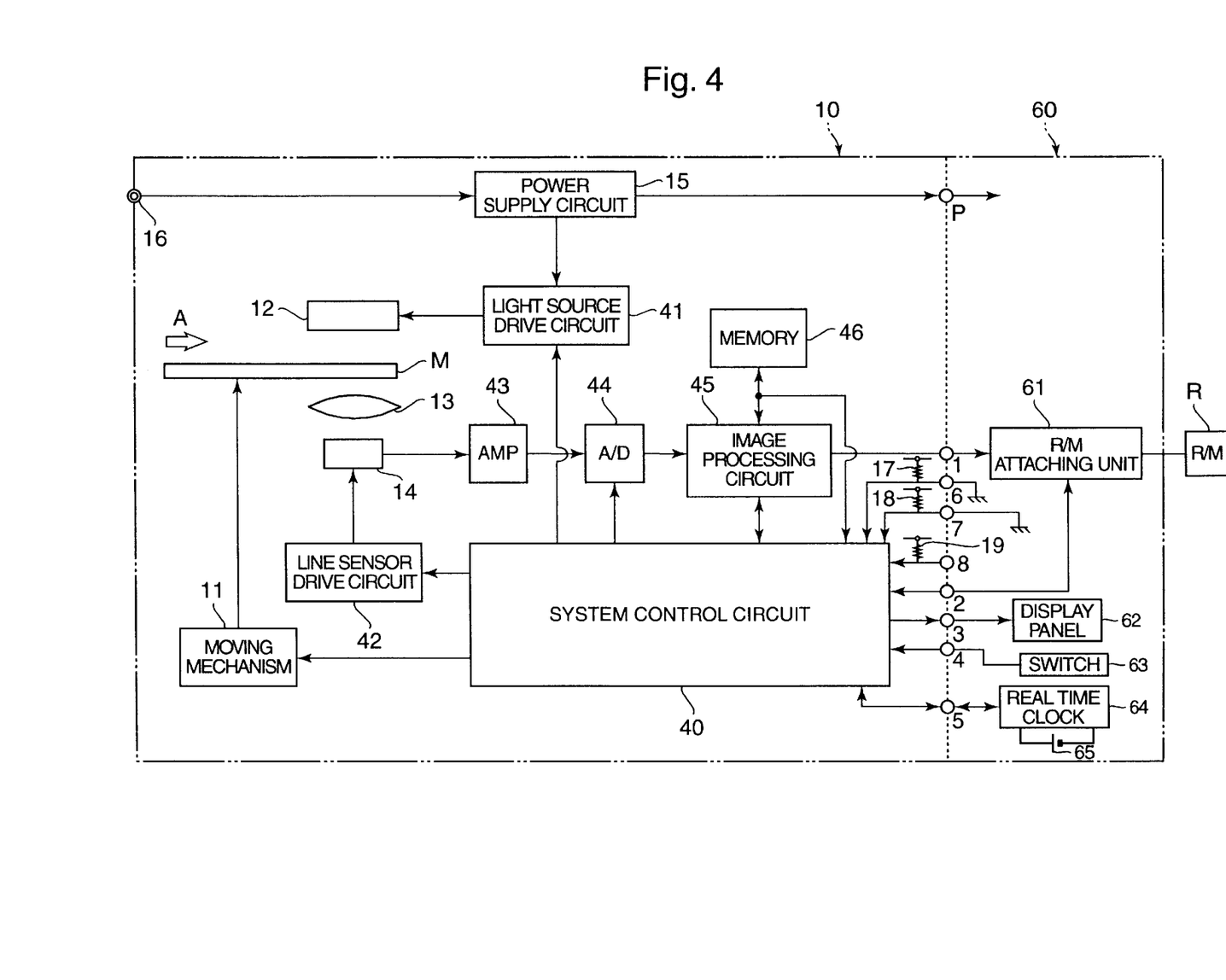
FIG. 4 is a block diagram showing the image reading device of the embodiment, in a state in which a recording medium interface adaptor is connected to the image reading device.

FIG. 4 shows a state in which the recording medium interface adaptor 60 is connected to the image reading device 10. Namely, the image reading device 10 is the same as that shown in FIG. 1. The recording medium interface adaptor 60 is attachable to and detachable from the image reading device 10, and is not in turn connected to any peripheral devices, i.e. a computer and so on. Namely, the image reading system composed of the image reading device 10 and the recording medium interface adaptor 60 is operated in a stand-alone mode.

Image data, which are read from the memory 46 in the image reading device 10 and are subjected to predetermined calculations, such as a color correction and a gamma correction, are transmitted through the first terminal 1 to a recording medium attaching unit 61 disposed in the recording medium interface adaptor 60. A recording medium R can be attached to the recording medium attaching unit 61. The image data, which have been transmitted to the recording medium attaching unit 61, are recorded in the recording medium R in accordance with a command signal, which is generated in the system control circuit 40 and transmitted to the recording medium attaching unit 61 through the second terminal 2. Namely, the recording medium attaching unit 61 has a circuit by which a format of the image data is changed so as to conform with the recording medium R.

Any recording medium, in which image data can be recorded, can be utilized as the recording medium R. For example, an ATA (AT attachment) flash memory card, which is included in a memory card (PC card) conforming to the PCMCIA standard, can be utilized. Note that the recording medium attaching unit 61 can be constructed in such a manner that a magneto-optic disc or a floppy disk can be attached thereto.

When the recording medium interface adaptor 60 is connected to the image reading device 10, the sixth and seventh terminals 6 and 7 are grounded, and the eighth terminal 8 is open. Therefore, when the recording medium interface adaptor 60 is connected to the image reading device 10, low level voltage signals are inputted to the system control circuit 40 through the sixth and seventh terminals 6 and 7, and a high level voltage signal is inputted to the system control circuit 40 through the eighth terminal 8. Due to this, the system control circuit 40 recognizes that the recording medium interface adaptor 60 is connected to the image reading device 10.

In the recording medium interface adaptor 60, a display panel 62, an operation switch 63 and a real time clock 64, to which a backup battery 65 is connected, are provided. The display panel 62, the operation switch 63 and the real time clock 64 are connected to the system control circuit 40 through the third, fourth and fifth terminals 3, 4 and 5. The display panel 62 has a liquid crystal display for indicating a date, an operating condition of the image reading system and so on. The operation switch 63 is provided for changing an operation mode of the image reading system, a recording operation of image data to the recording medium R and so on. The real time clock 64 is provided for controlling a date and a time. Electric power is supplied to the real time clock 64 by the backup battery 65, which is independent of the power supply for the image reading device.

Figure 5:
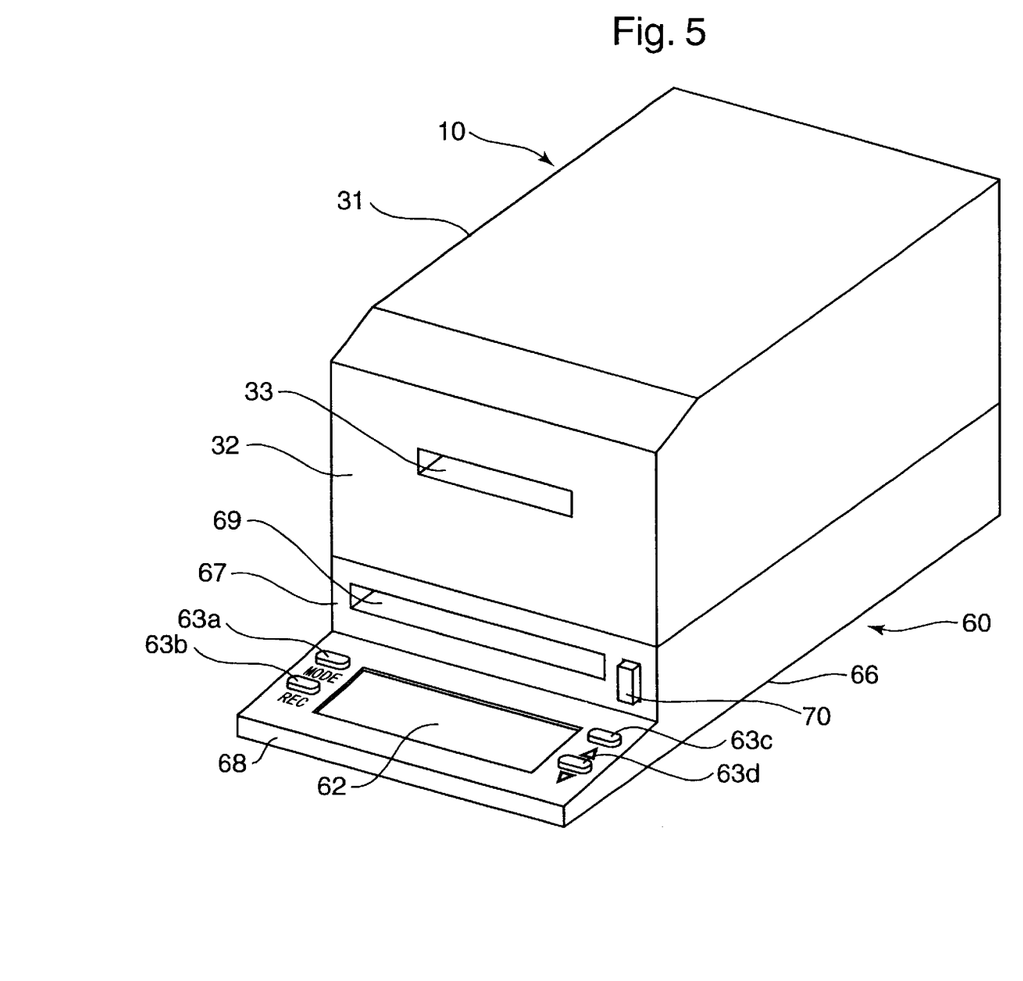
FIG. 5 is a perspective front-side view showing the image reading device to which the recording medium interface adaptor is connected.
Figure 6:
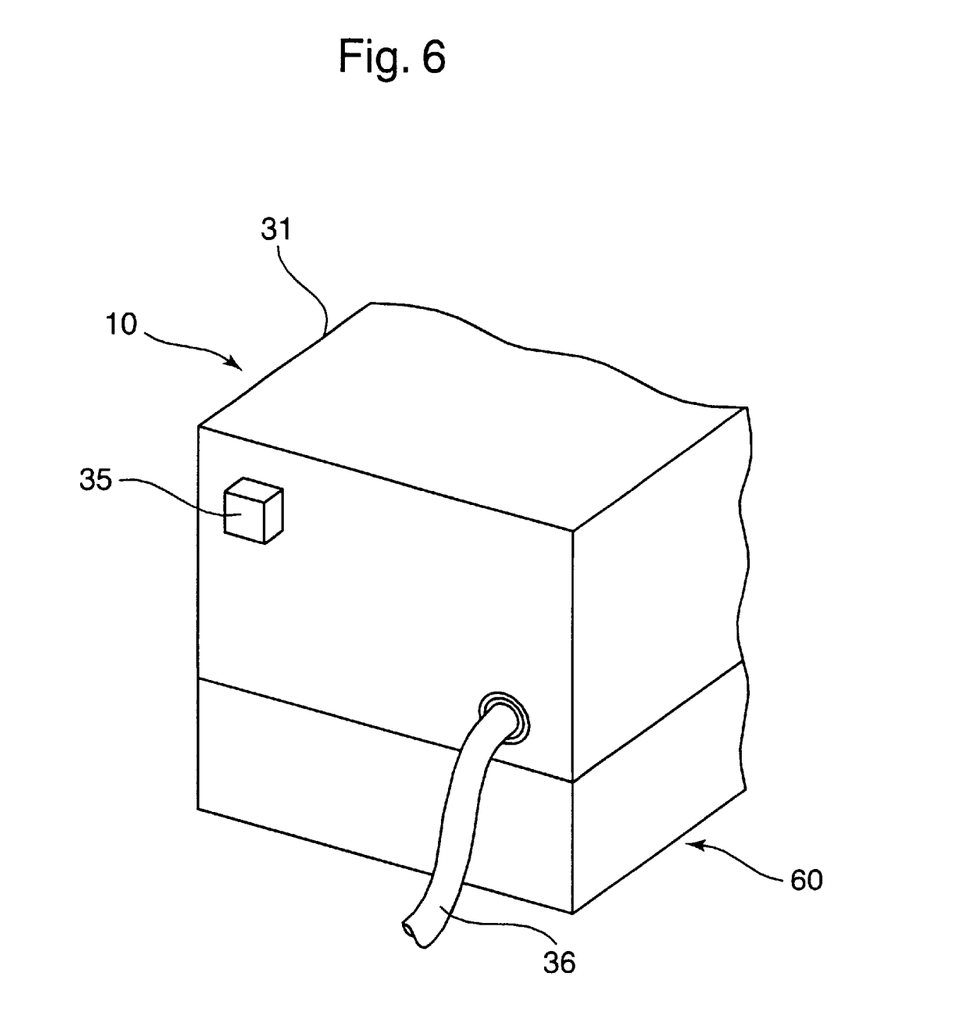
FIG. 6 is a perspective rear-side view showing the image reading device to which the recording medium interface adaptor is connected.
Figure 7A:
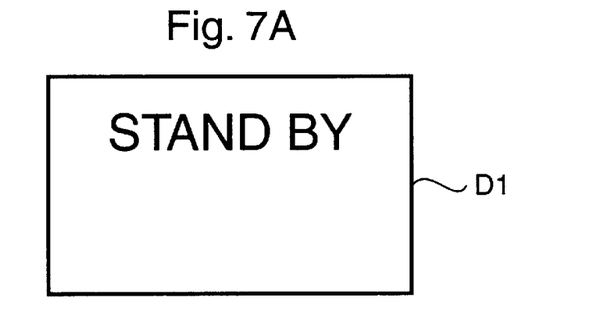
FIGS. 7A, 7B, 7C and 7D are views showing examples of indications on a display panel.
Figure 7B:
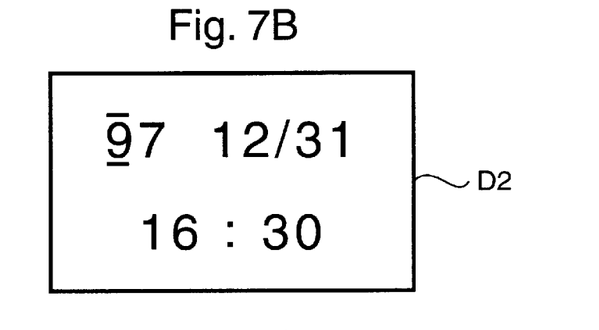
Figure 7C:
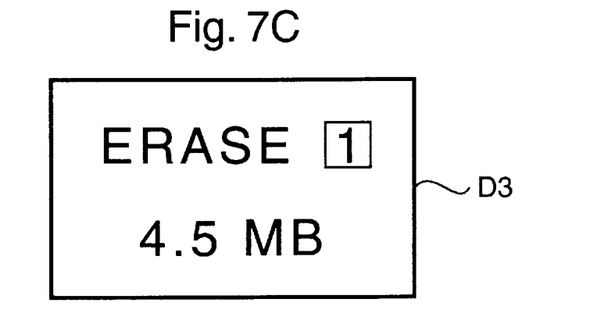
Figure 7D:
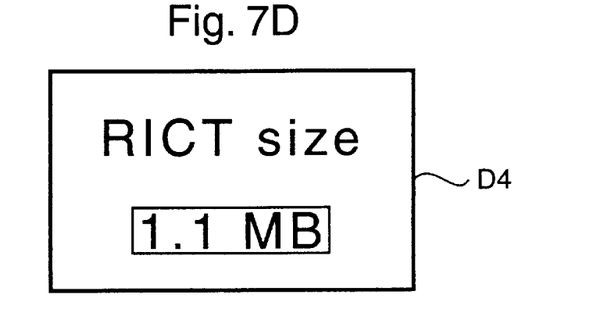

FIG. 5 shows the image reading device 10 to which the recording medium interface adaptor 60 is connected, when viewing obliquely from the front side of the image reading device 10. p FIG. 6 shows the image reading device 10 to which the recording medium interface adaptor 60 is connected, when viewing obliquely from the rear side of the image reading device 10. A housing 66 of the recording medium interface adaptor 60 is box-shaped and is flatter than the housing 31 of the image reading device 10. A lower front portion of the housing 66 is projected from the housing 66 to form an operation console unit 68.

The display panel 62 is provided on an upper surface of the operation console unit 68, and a mode change switch 63a, a recording switch 63b, an up-switch 63c and a down-switch 63d, which form the operation switch 63 (see FIG. 4), are disposed on both sides of the display panel 62. The mode change switch 63a is provided for changing an operation mode of the image reading device 10, and the recording switch 63b is provided for recording image data in the recording medium R. The up-switch 63c and the down-switch 63d are provided for changing a recording area of the recording medium R, in which image data should be recorded, for adjusting a date and a time, and for carrying out other operations.

A slot 69 is formed on a front surface 67 of the housing 66, above the operation console unit 68, allowing insertion of the recording medium R (see FIG. 4). An eject button 70 is arranged beside the slot 69 so that the recording medium R can be removed from the recording medium attaching unit 61. Namely, the recording medium R is inserted into the slot 69 and depressed by a predetermined amount so that the recording medium R is taken up by the recording medium attaching unit 61, and is removed from the recording medium attaching unit 61 by depressing the eject button 70.

FIGS. 7A, 7B, 7C and 7D show examples of indications on the display panel 62, when the recording medium interface adaptor 60 is connected to the image reading device 10. A first example D1, shown in FIG. 7A, indicates that a stand-by mode is set, in which an image recorded in the read object M can be read. A second example D2, shown in FIG. 7B, indicates that a date/time setting mode is set in which a date and a time, which are set in the system, can be adjusted. A third example D3, shown in FIG. 7C, indicates that an erasing mode is set, in which an image recorded in the read object M can be erased. A fourth example D4, shown in FIG. 7D, indicates that an image resolution setting mode is set, in which an image resolution in a reading operation of the image can be changed.

As described in the embodiment, by providing an external interface adaptor, which is compatible with a computer to be connected to the image reading device 10, the image reading device 10 can be connected to the computer via the external interface adaptor 60. Further, according to the embodiment, image data can be recorded to the recording medium R due to a connection between the image reading device 10 and the recording medium interface adaptor 60. Therefore, according to the embodiment, a degree of freedom of a type of connectable device which can be connected to an image reading device 10 is improved.

Furthermore, in the embodiment, the backup battery 65 is connected to the real time clock 64 of the recording medium interface adaptor 60. Therefore, a date and a time can be controlled without connecting the recording medium interface adaptor 60 to the image reading device 10.

Although the embodiments of the present invention have been described herein with reference to the accompanying drawings, obviously many modifications and changes may be made by those skilled in this art without departing from the scope of the invention.

What is claimed is:

1. An image reading system, comprising:

an image reading device that reads an image recorded in a read object;

a plurality of different interface adaptors, a single interface adaptor being selected from said plurality of different interface adaptors for selective attachment to said image reading device in accordance with a predetermined connectable device attached to said image reading device, said selected single interface adaptor being detachably attached to said image reading device and functioning to transfer image data from said image reading device to the predetermined connectable device, and for transferring data from the predetermined connectable device to said image reading device;

a sensing terminal that senses a type of said selected single interface adaptor attached to said image reading device;

a control terminal that controls said selected single interface adaptor in accordance with a sensing result from said sensing terminal, said image reading device including a system controller that controls an operation of the predetermined connectable device in response to an operation mode changing device of said selected single interface adaptor, wherein said connectable device comprises a recording medium, and said selected single interface adaptor is provided with a recording medium attaching unit to which said recording medium is attached, and wherein said operation mode changing device comprises an operation switch that sets a recording operation in which said image data is recorded to said recording medium, said operation switch being provided only on said selected single interface adaptor.

2. The image reading system of claim 1, wherein said selected single interface adaptor is provided with an interface circuit that converts a format of said image data in said selected single interface adaptor to a format of said connectable device.

3. The image reading system of claim 1, wherein said selected single interface adaptor is provided with a clock that controls a date and a time, and a backup-battery that independently supplies electric power to said clock.

4. An image reading system, comprising:

an image reading device that reads an image recorded in a read object to generate image data corresponding to said image;

a plurality of different interface adaptors, a single interface adaptor of said plurality of different interface adaptors being selected to be detachably attached to said image reading device in accordance with a predetermined connectable device provided externally to said image reading device, said selected single interface adaptor being detachably attached to said image reading device to convert a format of said image data to a format of said predetermined connectable device;

a sensing terminal that senses a type of said selected single interface adaptor attached to said image reading device;

a control terminal that controls said selected single interface adaptor in accordance with a sensing result from said sensing terminal, said image reading device including a system controller that controls an operation of the predetermined connectable device in response to an operation mode changing device of said selected single interface adaptor, wherein said connectable device comprises a recording medium, and said selected single interface adaptor is provided with a recording medium attaching unit to which said recording medium is attached, and wherein said operation mode changing device comprises an operation switch that sets a recording operation in which said image data is recorded to said recording medium, said operation switch being provided only on said selected single interface adaptor.

5. An image reading system, comprising:

an image reading device that reads an image;

a single recording medium interface adaptor, selected from among a plurality of different type interface adaptors in accordance with a connectable device to be attached to said image reading device wherein said connectable device comprises a recording medium, that is selectively attached to said image reading device so that image data is transferrable between said image reading device and said selected single recording medium interface adaptor, said selected single recording medium interface adaptor being detachably attached to said image reading device;

a sensing terminal that senses a type of said selected single recording medium interface adaptor attached to said image reading device; and a control terminal that controls said selected single recording medium interface adaptor in accordance with a sensing result from said sensing terminal, wherein said single recording medium interface adaptor includes an operation selection device, said operation selection device being electrically connected to a system controller of said image reading device such that said operation selection device controls an operation mode of said image reading system, wherein said selected single recording medium interface adaptor is provided with a recording medium attaching unit to which said recording medium is attached, and wherein said operation selection device comprises an operation switch that sets a recording operation in which said image data is recorded to said recording medium, said operation switch being provided only on said selected single recording medium interface adaptor.

6. The image reading system of claim 5, wherein said plurality of different type interface adaptors convert data of said image from a first format to a second format associated with an external device.

7. The image reading system of claim 6, wherein the external device comprises one of a computer and a recording medium.

8. The image reading system of claim 5, further including a control terminal that controls said selected interface adaptor in response to said sensed interface adaptor.

* * * * *